United States Patent [19]

Koehler et al.

[11] Patent Number: 5,005,731
[45] Date of Patent: Apr. 9, 1991

[54] HAND-HELD EXTRUDER

[75] Inventors: Harold W. Koehler, West Paterson; Alfred J. Anderson, Livingston; Alfred A. Finelli, Nutley, all of N.J.

[73] Assignee: Hardman Incorporated, Belleville, N.J.

[21] Appl. No.: 363,629

[22] Filed: Jun. 8, 1989

[51] Int. Cl.$^5$ .............................................. B67D 5/08
[52] U.S. Cl. .................................. 222/54; 222/146.5; 222/334; 222/413
[58] Field of Search ................... 222/146.1, 146.5, 54, 222/413, 333, 334

[56] References Cited

U.S. PATENT DOCUMENTS

| | | | |
|---|---|---|---|
| 2,694,509 | 11/1954 | Vita | 222/413 X |
| 3,750,905 | 8/1973 | Wolfrom | 222/146.5 X |
| 3,868,046 | 2/1975 | Maddalena | 222/146.5 |
| 4,067,481 | 1/1978 | Feldman | 222/146.5 |
| 4,275,808 | 6/1981 | Bullivant et al. | 222/413 X |

Primary Examiner—Michael S. Huppert
Assistant Examiner—Gregory L. Huson
Attorney, Agent, or Firm—Lerner, David, Littenberg, Krumholtz & Mentlik

[57] ABSTRACT

In a Hand-Held Extruder for polymeric materials such as elastomeric sealant compositions, an extruding barrel has, a material flow passage with an inlet for introducing the sealant material to be extruded into the material flow passage and a discharge outlet for discharging the sealant material, a thermostatically controlled heating mechanism for adjustably controlling the heat of the extruding barrel to maintain the material being extruded in plastic condition, and a screw type conveyor rotatably mounted in the extruder barrel for moving the plastic sealant material from the inlet to the discharge outlet of the material flow passage, the screw conveyor is driven by any suitable power source coupled to a double planetary gear reduction transmission assembly so as to provide a counterclockwise rotation of the screw conveyor without reduction in torque to increase the troughput and discharge of material from the material flow passage. The extruding barrel has a hardened steel barrel liner to maintain the screw conveyor in proper alignment and to prevent eroding of the material flow passage wall.

14 Claims, 3 Drawing Sheets

HAND-HELD EXTRUDER

BACKGROUND OF THE INVENTION

This invention relates generally to hand-held extruders for extruding polymeric materials and more particularly to a hand-held extruder adapted to extrude the polymeric materials at an improved predetermined rate and quantity. Additionally, the hand-held extruder in accordance with the present invention includes attachments which facilitate the handling and balancing of the extruder during use, and prevent the heated barrel from marring, damaging or otherwise injuring surfaces on which the extruder may be placed intentionally or accidentally.

The term "polymeric material" when used herein is intended to mean any polymer composition or mixtures of polymer compositions which can be heated to a consistency so that it can be extruded by suitable mechanical means such as a screw conveyor; for example; thermoplastic materials; elastomeric materials; and more particularly elastomeric sealant compositions; for which the present invention is particularly adapted.

The use of extruders for extruding elastomeric sealant materials is well known in the prior art as is shown in U.S. Pat. Nos. 2,668,986 and 3,953,006. Similarly, the use, of hand-held extruders is also well known in the art as is shown by U.S. Pat. Nos. 3,337,093, 3,750,905, 3,758,001, and 3,868,046.

In U.S. Pat. No. 3,750,905 one basic form of well known hand-held extruder easily purchasable on the open market used for the intermittent and continuous extrusion of heated thermoplastic sealant and other polymeric materials is shown as including, a generally unitary front assembly having, an elongated inner casing or barrel forming an extruding or feed passage extending end to end therethrough, and a three part outer housing consisting of, a barrel bushing, an insulated sleeve, and an end cap means so formed, shaped and connected that they hold and mount the elongated barrel therein, in fixed relative relation to the outer housing. The feed passage has an inlet opening at one end which is in alignment in assembled position with an inlet port on the bushing barrel, open to the exterior of the hand-held extruder, so thermoplastic sealant or other polymeric material can be fed or introduced into the feed passage of the elongated barrel. At the opposite end remote from the inlet opening a discharge outlet is in alignment with a discharge nozzle in the end cap so that heated thermoplastic sealant or other polymeric material can be dispensed from the hand-held extruder during the operation thereof. Heating of the thermoplastic sealant or other plastic material charged into the feed passage is accomplished by means of electrical heating elements which are disposed along the longitudinal line of the barrel in suitable passages parallel to the feed passage along with a rheostat and a thermostat to control and maintain the barrel at a predetermined temperature depending on the conditions of operation. The thermoplastic sealant or other polymeric material is moved through the feed passage by means of a conventional screw type conveyor which is rotatably mounted in the feed passage for counterclockwise rotation and extends through a partition in the barrel bushing to enable the screw conveyor to be connected to suitable reduction gearing in a torque housing to which the barrel bushing can be detachably connected. The torque housing is in turn mounted in offset relation on the pistol grip section of a main housing for a suitable driving means such as an electric motor to which the opposite end of the reduction gearing is so connected that when the driving means is actuated during operation of the hand-held extruder by a trigger switch on the pistol grip main housing, the screw conveyor will be rotated in the desired counterclockwise direction to move the thermoplastic sealant or other polymeric material in the feed passage for dispensing the same from the dispensing nozzle in the end cap.

The hand-held extruder shown in U.S Pat. No. 3,750,905 discloses diagrammatically a complicated gear train for transmitting power from the electric motor to the screw conveyor. It does not detail the actual elements in the drive train, but merely identifies them as being of conventional design. It will however be apparent to those skilled in the art from just the drawings that in order to convert the conventional clockwise direction of rotation of the electric motor to the counterclockwise direction of rotation for the conventional screw conveyor and to reduce the number of revolutions per minute at which the screw conveyor operates that a complex gear train; in actual commercial use epicyclic gearing was required; had to be used which entailed a large gear housing as shown in the drawing for U.S. Pat. No. '905.

This drive train caused problems because this hand-held extruder as disclosed in U.S. Pat. No. '905 operated relatively slowly, with a relative low efficiency, and barrel or other mechanical failures occurred because the viscosity of the material being extruded could not be controlled particularly during intermittent operation.

The present invention provides an improved hand-held extruder which overcomes these problems in which a modified air motor rotated in a counterclockwise direction is combined with a double or two-stage planetary reduction gear to provide a driving train to enable the extruder to discharge heated thermoplastic sealant or other polymeric materials at an improved rate and quantity without loss of torque or reduction of driving power during operation of the hand-held extruder.

Further, however, this driving train for the hand-held extruder in accordance with the present invention enables the generally unitary barrel assembly to be aligned with the gear train housing and the main housing which among other advantages prevents the mechanical failures heretofore experienced with the prior art form of extruder shown in U.S. Pat. No. '905, and enables the extruder in accordance with the present invention to operate within at least an 80% efficiency range.

The improved driving train and the corresponding changes in the construction which are achieved eliminated the complex gear train and offset gear box housing of the prior art extruder which absorbed horsepower due to friction thus reducing efficiency, and was one of the sources of mechanical failure. The offset gear box housing in the prior art extruder required special castings and thus increased the cost of manufacture of this prior art device.

The changes in the gear train for the hand-held extruder of the present invention permits alignment of the barrel assembly, the two stage planetary gear train housing and main housing for the air motor as is more fully described below, simplifies the construction, and reduces cost of manufacture and time of assembly during manufacture and in the field servicing of this improved hand-held extruder.

Thus, the driving train for the hand-held extruder in accordance with the present invention is stronger, more dependable, reduces the down time of the extruder, and simplifies disassembly and reassembly in the field during commercial use of this device.

Additionally, the improved hand-held extruder in accordance with the present invention provides an improved handle assembly disposed in spaced relation to the pistol grip housing to enable the operator to better hold, grip, and balance the hand-held extruder during the use thereof.

The improved hand-held extruder in accordance with the present invention is also provided with a safety feature in the form of a tool or table rest about the generally unitary front assembly which prevents the marring or damaging of any adjacent surface on which the hand-held extruder may be placed accidentally, inadvertently or otherwise by the operator.

SUMMARY AND OBJECTS OF THE INVENTION

Thus the present invention covers an improved hand-held extruder having, main housing means including, a pistol grip section, and a two stage planetary gear assembly housing clamped at one end to the pistol grip section, driving means mounted in said pistol grip section of the main housing means having, a driving shaft, said two stage planetary gear assembly housing having, reverse threaded connecting means at the end remote from the pistol grip section of the main housing, double or two stage planetary reduction gearing mounted in said two stage planetary or gear assembly housing in alignment and connected at one end to said driving shaft and having a driven shaft at the opposite end, a generally elongated generally unitary front housing assembly including, a barrel bushing, an insulated sleeve, and an end cap, said barrel bushing having matching threaded means for detachably connecting said front housing assembly to the reverse threaded connecting means on said double planetary gear assembly housing so the longitudinal line of the front assembly is in alignment with the driven shaft of the double planetary reduction gearing, said barrel means mounted in operative association with the said barrel bushing, insulated sleeve and end cap of the front housing assembly and having, material feed passage means extending end to end therethrough along the longitudinal line of said front housing, said front assembly has, i. inlet means in communication with said material feed passage for introducing the material to be extruded, ii. dispensing outlet means in communication with said material feed passage means remote from said inlet means for discharging said material from the hand-held extruder, and iii. said barrel means has heating means for heating the material to be extruded in said material feed passage means, screw conveyor means mounted for counterclockwise rotation in said material feed passage means is connected in assembled position in alignment with the driven shaft of said double planetary reduction gearing, and said driving means, driving shaft, double planetary reduction gearing, driven shaft, and screw conveyor operative to rotate the screw conveyor in a counterclockwise direction at a predetermined number of revolutions per minute without reduction in torque whereby the throughput and dispensing of material from the material flow passage will be increased.

Additionally, a hand-held extruder as above described having, handle connecting means on the front assembly a spaced distance from the pistol grip section of the main housing means, and handle means detachably connectible to said handle connecting means.

Additionally, a hand-held extruder as above described including, tool rest means, said tool rest means mounted about the barrel means and operatively held in assembled position between the barrel bushing and the insulated sleeve on said front assembly.

Accordingly, it is an object of the present invention to provide an improved hand-held extruder having a screw conveyor mounted for counterclockwise rotation in the material feed passage means and so connected with an improved driving train for rotating said screw conveyor that the screw conveyor will be rotated counterclockwise at a predetermined number of revolutions per minute with sufficient improvement in torque that the throughput and dispensing of material extruded by the hand-held extruder will be increased.

It is another object of the present invention to provide a hardened steel barrel liner for the barrel of the hand-held extruder which enhances the wearing properties and life of the barrel, eliminates chips or particles from the barrel wall from adulterating and being extruded with the material being extruded, and avoids the tendency of the screw conveyor to distort and wobble by keeping and maintaining the screw conveyor in alignment with the driving train.

It is another object of the present invention to provide a hand-held extruder having a handle attachment thereon remote from the pistol grip section to enable the operator to hold and balance the hand-held extruder more easily.

It is another object of the present invention to provide a hand-held extruder with a tool rest to prevent any surface on which the hand-held extruder is placed either accidentally, inadvertently or otherwise from being marred or damaged.

These and other objects and advantages of the present invention will become apparent from the following more detailed description and claims when taken with reference to the drawings in which:

DESCRIPTION OF A PREFERRED EMBODIMENT

Referring to the drawings, FIGS. 1 to 7 of the drawings show one form of hand-held extruder in accordance with the present invention generally designated 10.

Hand-held extruder 10 has a main housing or frame 11 having a pistol grip section 12. Driving motor 13 is mounted in the main housing 11 and in this form of the invention is shown as an air motor which is driven by compressed air charged into motor 13 through compressed air inlet 14 and the spent air from the motor is discharged through a spent air discharge outlet 15.

A trigger mechanism 13a slidably mounted in the pistol grip section 12 is operatively connected to a suitable valve means 13b for controlling the flow of air through the compressed air inlet 14 to driving motor 13. Thus, in the operation of the hand-held extruder, the operator can grasp the pistol grip section 12 of the main housing 11 and by squeezing the trigger mechanism 13a can easily control the flow of compressed air for operating driving motor 13.

The air motor 13 shown in phantomized form in main housing 11 includes the usual rotor and sliding vanes, however it differs from the conventional air motor in that the passages and ports have been modified to enable the air motor not only to fit within the main housing or frame 11 but to rotate with the driving shaft which is fixedly connected to the rotor and generally designated 13c, in a counterclockwise direction. This modification of the air motor permits a more simplistic driving train as will be described hereinafter.

While an air motor is shown those skilled in the art will recognize that other forms of driving motors such as hydraulically or electrically driven motors in which the direction of the driving shaft is counterclockwise can be used without departing from the spirit and scope of the present invention.

Figure 2:
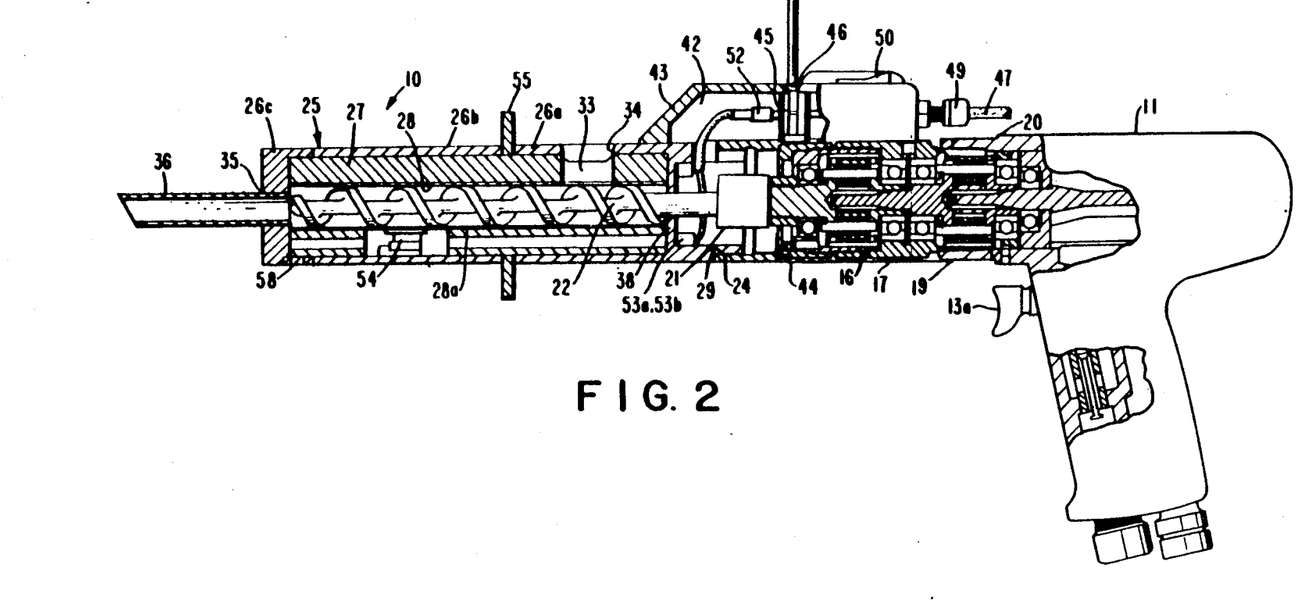
FIG. 2 is a side elevational view partly in vertical section taken on line 2—2 of the hand-held extruder shown in FIG. 1 showing the aligned driving train, the screw conveyor connected thereto and the hardened steel liner in the barrel for the hand-held extruder.
Figure 3:
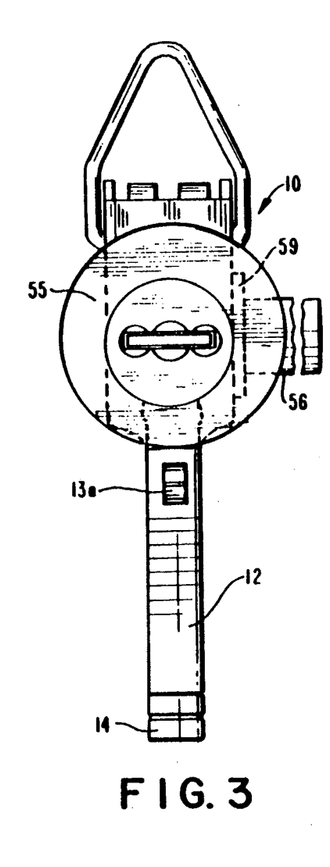
FIG. 3 is a front view of the hand-held extruder shown in FIG. 1.
Figure 4:
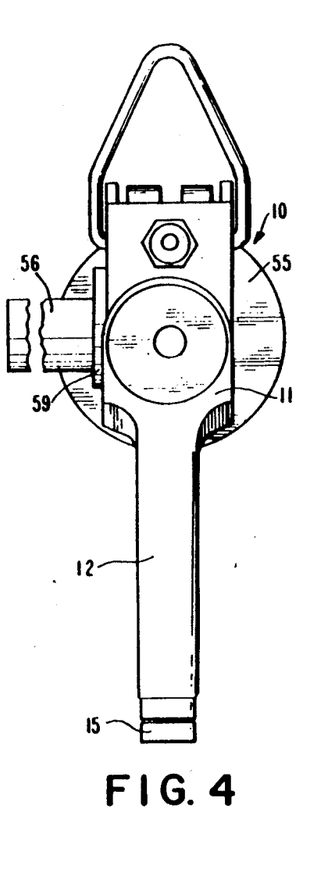
FIG. 4 is a rear view of the hand-held extruder shown in FIG. 1.
Figures 5, 8:
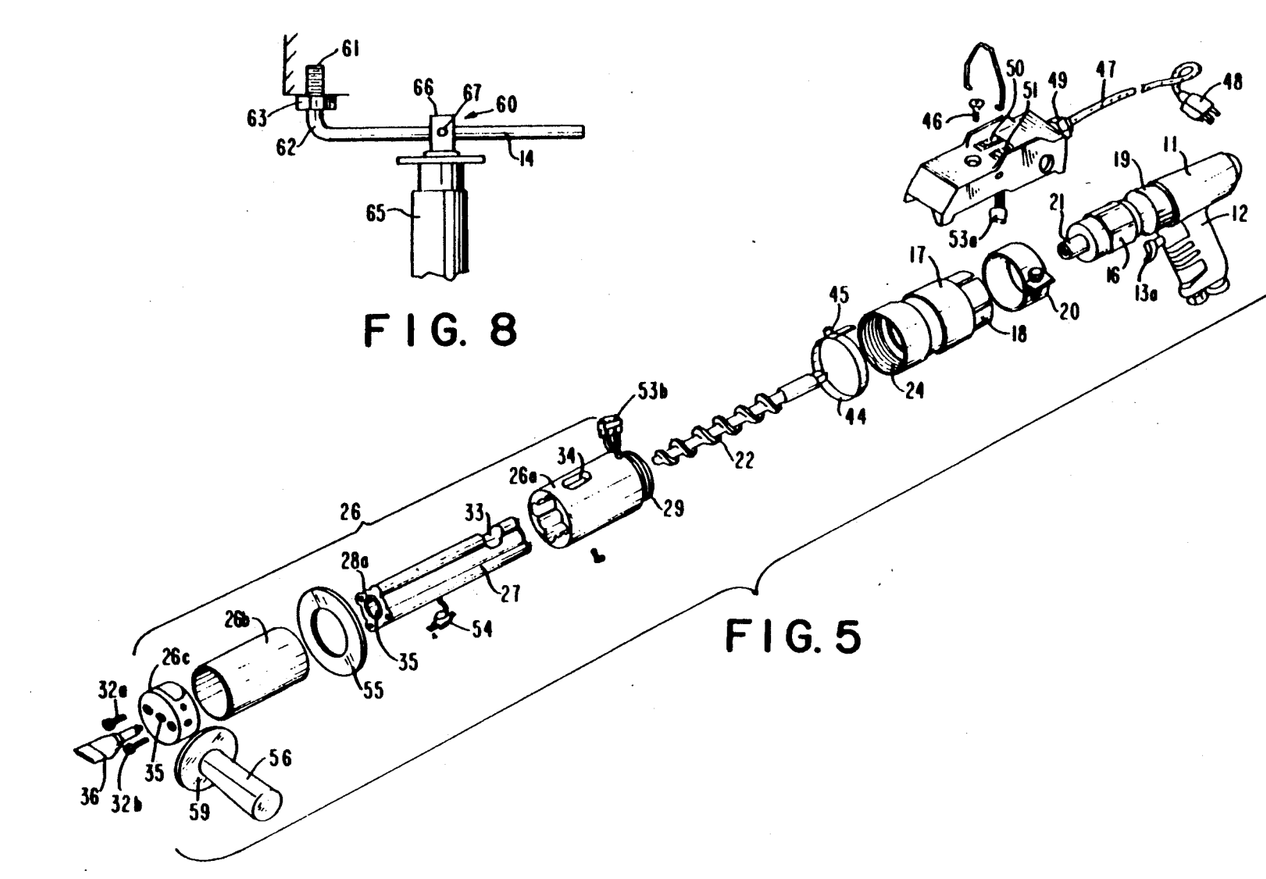
FIG. 5 is an exploded view of the hand-held extruder shown in FIG. 1.
FIG. 8 shows an alternate form of bracket and front handle means.
Figure 6:
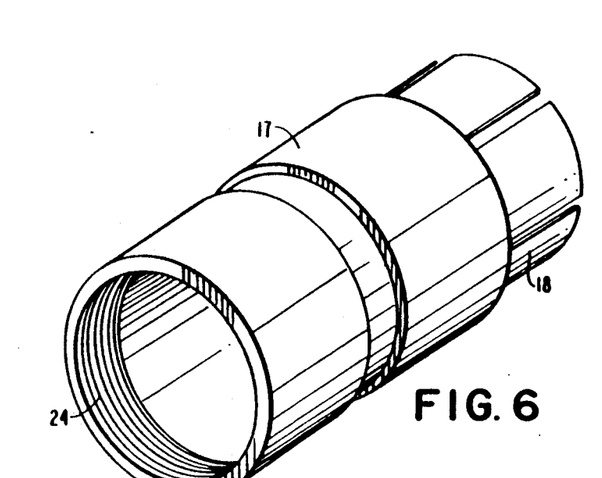
FIG. 6 is an enlarged perspective view of the double planetary gear assembly housing.

Projecting approximately normal to the pistol grip section 12 of main housing 11 is a double planetary gear reduction assembly generally designated 16 which includes predetermined sized double planetary reduction gearing therein as will be understood by those skilled in the art. A double planetary gear assembly housing 17 is disposed about the double planetary gear reduction assembly 16 and is provided at one end with a splined connector 18 for sliding fit engagement with an annular flange 19 formed on the main housing 11. The double planetary gear assembly housing 17 is held in assembled position by a simple clamp 20 to permit easy disassembly of the housing 17 from the main housing 11 in the event that any servicing, repair or adjustment of the driving train for the hand-held extruder 10 is required, all of which is shown in FIGS. 2, 5 and 6 of the drawings In assembled position double planetary reduction assembly 16 is aligned and operatively connected to the driving motor 13 to provide at the outboard end of the assembly 16 a driven shaft and connector 21 to which, one end of a screw conveyor 22 can be simply and easily detachably connected. Screw conveyor 18 is mounted for counterclockwise rotation in a generally unitary front assembly designated 25 for receiving and extruding heated thermoplastic sealant or other polymeric materials which is aligned and connected to the main housing 11 as is more fully described hereinafter.

Driving motor 13, double planetary reduction gearing assembly 16 in the housing 17, and the rotatably mounted screw conveyor 18 are so aligned and connected in assembled position that a simple means is provided for rotating the screw conveyor 18 in a counterclockwise direction at a substantially constant number of revolutions per minute (RPM) in which an improved balance between the reduction in RPM and the torque on the driving shaft and screw conveyor are so established that the hand-held extruder in accordance with the present invention does not stall but further acts to increase the throughput and discharge of the heated thermoplastic sealant or other polymeric materials from the front housing assembly 25 of the hand-held extruder 10.

It is well recognized that when you reduce the RPM at which a driving motor normally rotates by adding suitable reduction gearing means, that the torque on the driving shaft goes up. In the prior art hand-held extruder such as is shown in U.S. Pat. No. '905 when the RPM was reduced under the load of the material being extended from the material feed passage the torque at the operating speeds extruded material from the extruder at 15 foot pounds (ft. lbs.) per hour. If higher speeds were attempted, the torque acting on the driving shaft produced stalling of the driving motor.

In the present invention by reversing the operation of the driving motor and reducing the friction and other factors which effect the efficiency of the driving train, the hand-held extruder was found to operate at higher speeds at almost 30 ft. lbs. per hour without stalling.

Those skilled in the art will readily recognize that where the driving train is capable of operating at double the torque that the throughput of the material being extruded will also be doubled.

However, in order to achieve the desired driving alignment suitable connections between the double planetary gear assembly housing 17 and the front assembly 25 had to be established as will now be described.

Double planetary gear assembly housing 17 at the end remote or opposite from the end connected to the main housing 11 has a reverse internally threaded section as at 24 to provide means for connecting the front assembly 25 to the main housing 11 so that the screw conveyor 18 therein will be disposed in alignment for easy assembly to the driving shaft and connector 21 on the outboard side of double planetary gear reduction assembly 16, all of which is shown in FIGS. 2, 5, 6 and 7 of the drawings.

Figure 7:
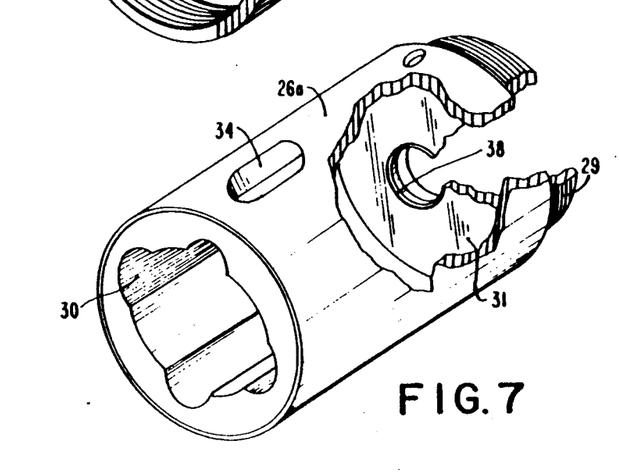
FIG. 7 is an enlarged view of the barrel bushing partly in vertical section to show the inner back wall.

With particular reference to FIG. 2, the exploded view at FIG. 5, and the enlarged views at FIGS. 6 and 7, the generally unitary front assembly 25 for receiving thermoplastic sealant or other polymeric materials, for heating, and for discharging the heated extrudate either continuously or intermittently as conditions of operation require, is a three part outer housing which includes, a barrel bushing 26a, an insulated sleeve 26b, and an end cap 26c, in serial alignment. Mounted in and operatively connected to these outer housing elements is an elongated inner casing or barrel 27 having an extruder or material feeding passage 28 extending end to end therethrough along the longitudinal line of said inner casing or barrel 27.

In order to connect the generally elongated front assembly 25 into assembled position, the barrel bushing 26a is shown as a generally cylindrical member which is threaded about the back end as at 29 so that in assembled position the barrel bushing 26a can be threadably connected into the reverse internal threaded section 24 on the associated end of the double planetary gear assembly housing 17, as is shown in FIGS. 2, 5, 6 and 7 of the drawings The housing 17 is reverse threaded as at 24 so that when the extruder is in operation, the inherent torque due to the rotation of the screw conveyor will cause the barrel bushing 26a and the torque housing 17 to remain in assembled position. If conventional threading is used these elements will separate and cause mechanical failure during operation of the extruder 10. Those skilled in the art will readily recognize this problem and will further understand why the opposite end is splined and connected by the clamp to prevent separation of the main housing or frame 11 from the double planetary gear assembly housing 17.

Barrel bushing 26a has a shaped inner wall which defines a square barrel receiving chamber 30 open at one end to receive one end of the inner casing or barrel 27 which has a corresponding and matching exterior shape so that in assembled position and during operation of the hand-held extruder 10 there will be no relative rotational movement between the outer housing 26 and the inner casing or barrel 27. A transverse partition 31 inwardly of the threaded end 29 limits the extent to which the barrel 27 can be extended into the barrel bushing in assembled position, as will be clear by reference to FIGS. 2, 5 and 6 of the drawings.

FIG. 2 shows that when the barrel 27 is assembled into the barrel bushing 26a that the insulated sleeve 26b has a sliding fit to enable it to be assembled over the barrel 27 and the three elements of the outer housing 26 are held in assembled position about the barrel 27 by means of the end cap 26c and threaded members 32a and 32b which extend into the adjacent end of the barrel 27.

Figure 1:
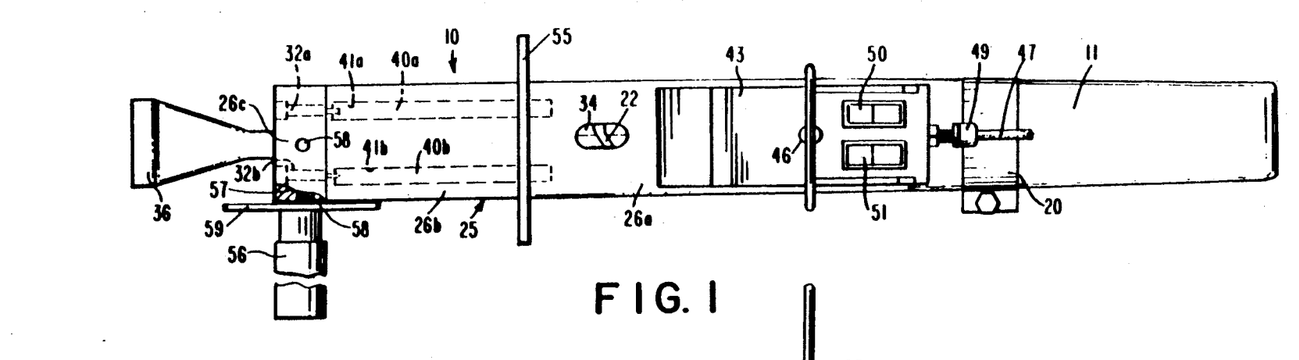
FIG. 1 is a top plan view of one preferred form of hand-held extruder in accordance with the present invention.

Reference is now made to FIGS. 1 and 2 which show that the barrel 27 is provided with an inlet opening 33 which communicates at one end with the extruder or material handling passage 28 and at the opposite end is in alignment with a charging port 34 formed in the wall of the barrel bushing 26a for charging the thermoplastic sealant or other polymeric material to be extruded into the material handling passage 28. At the end of the barrel 27 opposite from the inlet opening 33, a discharge outlet 35 for the material handling passage 28 communicates with a dispensing nozzle 36 in end cap 26c for discharging the thermoplastic sealant or other polymeric material in the material handling passage 28 when the hand-held extruder 10 is placed into operation.

Screw conveyor 22 is rotatably mounted in the longitudinal line of the material handling passage 28 and has a length such that the inboard end 37 which forms a connector extends through a suitable bushing 38 in the transverse partition 31. Thus, when the generally unitary front assembly 25 is threaded by means of the threaded end 29 of the barrel bushing 26a into assembled position in the reversible internal threaded section 24 of the double planetary gearing assembly housing 17, screw conveyor 22 also can be operatively connected to the driving shaft and connector 21 provided on the double planetary reduction gearing 16 in the double planetary gearing assembly housing 17 for rotating the screw conveyor 22 when the driving motor 13 is placed into operation.

Further, however, because the barrel 27 is made of aluminum which is a good heat conductor, for reasons that will be clear in regard to the heating of the material to be extruded from the material feeding or handling passage 28 as described below, it will unless protected be subject to erosion by the distortion and wobble of the screw conveyor during operation of the hand-held extruder, 10 which will add unwanted chips or particles of aluminum to the material being extruded In order to overcome this problem, the barrel is provided as at 28a with a hardened steel barrel liner end to end along the material handling passage 28 in which the screw conveyor 22 rotates. This hardened steel barrel liner 28a also acts in the nature of a bushing to not only enhance the wear properties of the barrel and thus increase the life of the hand-held extruder in accordance with the present invention but further acts to maintain the alignment of the screw conveyor 22 in assembled position so as to decrease the tendency of the screw conveyor 22 to wobble and distort during rotation when the hand-held extruder 10 is in operation.

It is well known that the sealants and other polymeric materials handled by the hand-held extruder 10 can be more easily extruded if they are put in some plastic form at a lower viscosity. This is accomplished in the barrel 27 by means of spaced electrical heating elements as at 40a and 40b which are disposed in suitable longitudinally extending passages 41a and 41b in the barrel 27 so that heat can be conducted through the wall of the barrel for heating the thermoplastic sealant or other polymeric material to bring it to the optimum temperature before it is extruded from the hand-held extruder during use.

Any suitable circuit for delivering current for heating the electrical heating elements 40a and 40b may be used such as the electrical circuit illustrated in U.S. Pat. No. '905 for this purpose. Therefor, a more detailed description of such electrical circuit is not deemed necessary as will be understood by those skilled in the art.

The electrical circuit, not shown, for the present invention is disposed in part, in an enclosure or chamber 42 formed by an elongated cup shape top cover 43 which is connected on the upper or top face of the hand-held extruder so that in assembled position, it fits across the main housing 11, double planetary gear assembly housing 17, and the back end of the barrel bushing 26a, as is shown in FIGS. 1 and 2 of the drawings. An expandable strap 44 disposed about the double planetary gear assembly housing 17 having a threaded plastic covered fitting 45 enables threaded means 46 to connect the top cover 43 in this assembled position.

The electrical line 47 for connecting the electrical circuit, not shown, to a source of electricity by means of conventional line plug 48 enters the enclosure or chamber 42 through the entrance fitting 49 connected to the back end of the top cover 43 where it is connected into the circuit so that an on-off line switch 50 can be manually operated when the hand-held extruder 10 is to be placed into use. A signal light 51 is provided and when lighted shows that current is flowing to the electrical circuit, not shown.

Electrical current from the electrical line 47 is passed to the electrical circuit, also not shown, for actuating the electrical heating elements 40a and 40b by means of a molex plug 52 and a detachable connection consisting of the coacting and connectible half plugs, 53a and 53b as is shown in FIGS. 2 and 5 of the drawings.

A conventional thermostat 54 mounted in the wall of the barrel 27 is also provided in the electrical circuit to maintain the temperature of the barrel 27 within predetermined operating limits.

Disposed about the outer surface of the barrel 27 and clamped in assembled position between the front edge of the bushing barrel 26a and the back edge of the insulated sleeve 26b, is an annular collar or tool rest 55. Annular collar or tool rest 55 is made of any strong insulating material and is so sized that in this assembled position it acts as a safety device to prevent the hot portion of the front assembly 11 from injuring or damaging any adjacent surface on which the hand-held extruder 10 may be placed deliberately, accidentally or inadvertently during the use and operation.

Those skilled in the art will recognize that the better control of the hand-held extruder 10 that the operator or user has, the easier it will be to dispense or extrude the thermoplastic sealant or other polymeric material being dispensed. Accordingly, the hand-held extruder in accordance with the present invention is provided with a front handle 56 which is connected to the front end of the hand-held extruder a spaced distance from the pistol grip section 12 of the main housing 11. Thus, the handle 56 is provided with a threaded end section as at 57 which can be threaded into any one of a plurality of circumferentially spaced threaded bores 58 in the end cap 26c to position the handle 56 for the convenience of the operator during use and operation of the hand-held extruder 10. A heat shield as at 59 is provided to protect the operator's hand.

FIG. 7 shows an alternate and adjustable means for attaching the handle to the front end of the hand-held extruder 10 which includes, the L-shaped bracket 60 having a threaded connecter 61 on the short leg 62 and a locking nut 63 is provided on the threaded connecter for holding the L-shaped bracket 60 in assembled position. For assembly, the threaded connecter 61 will be threaded into any one of the threaded bores 58 on the end cap 26c so that the elongated leg 64 extends in a backward direction generally parallel to the longitudinal line of the hand-held extruder 10. The locking nut 63 will be used to lock the L-shaped bracket in assembled position A handle member 65 has an annular end connector 66 sized for sliding fit engagement along the elongated leg 64 of L-shaped bracket 60. When the handle 65 is assembled onto the elongated leg 64 and adjustably positioned by the operator, it can be locked in position by the set-screw 67. While an allen type set-screw is shown for this purpose, a thumb-screw can also be used without departing from the purpose and object of locking the handle into adjusted position.

OPERATION

In operation, the desired front assembly 25 is threaded into assembled position and the end of the screw conveyer 22 is connected into the driving shaft and connector 21 as was above described. Line plug 48 is then connected to any suitable source of electricity and line switch 50 placed in the —on— position for delivering current through the electrical circuit, not shown, to the electrical heating elements 40a and 40b. The indicator light 51 will show that the electrical circuit is in operation.

Hand-held extruder 10 is now permitted to preheat under control by the thermostat for a short period of time. After the barrel 27 reaches operating temperature, the operator holding the hand-held extruder 10 by the front handle 55, or 65 as the case may be, and the pistol grip section 12, will feed the thermoplastic sealant or other polymeric material to be extruded which may be in rods or in more or less thick elongated rope like form, into the charging port 34 and inlet opening 33 in communication with the material feeding passage 28 in barrel 27. Simultaneously, by pressing the trigger mechanism 13a, the operator will deliver compressed air to the driving motor 13 placing the driving motor into operation and the driving train consisting of the double planetary reduction gearing 16 in the double planetary gear assembly housing 17 and driving shaft 21 connected to the screw conveyer 27 to cause the screw conveyer to rotate counterclockwise at the desired number of revolutions per minute for moving the thermoplastic sealant or other polymeric material in the material feeding passage to the discharge outlet 35 where it is dispensed through the dispensing nozzle 36 to the desired point of use.

When the operator releases the trigger mechanism 13a, extrusion of the material being dispensed will stop. However, since the electrical circuit, not shown, will continue to deliver thermostatically controlled current to the electrical heating elements, the barrel 27 will not overheat and will act to maintain the thermoplastic sealant or other polymeric material in the barrel 27 in softened condition at the desired viscosity so that when the trigger mechanism 13a is again actuated by the operator such material can be dispensed without any delay.

The insulated sleeve 26b helps to retain the heat in the barrel 27 to increase the efficiency of the hand-held extruder 10 and acts as a safety device to prevent conduction of heat from the barrel 27 to the operator or adjacent surfaces with which the barrel end of the hand-held extruder 10 may come into contact. The annular tool rest 54 also coacts with the front end of the hand-held extruder 10 for the same purpose as was above described.

When it is desired to terminate operation of the hand-held extruder 10, delivery of the material being dispensed is terminated and the hand-held extruder is operated until all or substantially all of the material being extruded is emptied from the material feeding passage 28. Line switch 50 is then moved to the —off— position. When the barrel 27 has cooled the front assembly 25 can be detached from assembled position dismantled and cleaned so that it can be reused when desired.

Thus, an improved hand-held extruder has been described which is capable of delivering a higher throughput of thermoplastic sealant or other polymeric material without loss in torque or overload on the driving train. Additionally, the improved hand-held extruder provides improved means for the handling and balancing the hand-held extruder during the use and operation, thereof, and safety features against the damage that can be caused if proper precautions are not taken with respect to the heated barrel end of the hand-held extruder.

The foregoing description and accompanying drawings relate to a preferred embodiment of the invention. It will be understood that changes and modifications can be made without departing from the scope of the present invention as is more fully defined in the claims which now follow.

What is claimed is:

1. A hand-held extruder comprising,
   a. main housing means including, a pistol grip section, and a double planetary gear assembly housing having, a first connecting means for connecting the double planetary gear assembly housing in alignment with the main housing means, and a reverse internally threaded section at the end remote from said first connecting means,
b. counterclockwise rotating driving means mounted in said main housing means,
c. double planetary gear reduction means in said double planetary gear assembly housing operatively connecting at one end to said driving means and having a driven shaft and connector at the opposite end,
d. front assembly means having a second connecting means for connecting said front assembly means to the reverse internally threaded connecting means on said double planetary gear assembly housing for alignment therewith and to prevent separation of the front assembly means from the double planetary gear assembly housing during operation of the extruder,
e. said front assembly means including, outer housing means, and barrel means mounted in said front assembly means,
f. said barrel means including,
  i. a material feeding passage extending end to end along the longitudinal line of said front assembly means,
  ii. means in said barrel means for heating material in said material feeding passage,
  iii. an inlet means in communication with said material feeding passage for charging material to be extruded into said material feeding passage, and an outlet means in communication with said material feeding passage a spaced distance from said inlet means for discharging heated material from said hand-held extruder, and
  iv. means for controlling the heating means on said barrel means,
g. screw conveyor means rotatably mounted in the material feeding passage in said barrel means and extending out of said front assembly means at the end with the second connecting means thereon,
h. said screw conveyor means connected at one end to and in alignment with said driven shaft on said double planetary gear reduction means, and
i. said driving means, double planetary gear reduction means, driven shaft, and screw conveyor means so connected that during operation of said hand-held extruder the screw conveyor means is rotated counterclockwise at a predetermined number of revolutions per minute without reduction in torque of said driving means to increase the throughput and discharge of material from said material feeding passage at a predetermined rate.

2. A hand-held extruder comprising,
a. main housing means including, a pistol grip section, and a double planetary gear assembly housing including, first connecting means for connecting the double planetary gear assembly housing in alignment with the main housing means,
b. said double planetary gear assembly housing having, a reverse internally threaded connecting means at the end remote from the end connected to said main housing means,
c. driving means in said main housing means rotated counterclockwise including, an on-off switch means for actuating operation of said driving means,
d. double planetary gear reduction means in said double planetary gear assembly housing operatively connected at one end to said driving means to provide a driven shaft and connector at the opposite end adapted to rotate counterclockwise at a predetermined number of revolutions per minute,
e. front assembly means having, second connecting means at one end to connect said front assembly means to said reverse internally threaded connecting means, for alignment with said double planetary gear assembly housing and to prevent separation during operation of the hand-held extruder,
f. said front assembly means, including an outer housing, an inner barrel means having, a material feeding passage extending end to end therethrough along the longitudinal line of said front assembly means, and means for heating and maintaining said barrel means at a predetermined temperature,
g. said material feeding passage having, an inlet for charging material to be extruded into said material feeding passage, and a dispensing outlet for dispensing the material from said hand-held extruder,
h. screw conveyor means rotatably mounted in the material feed passage of said barrel means and disposed for connecting to said driven shaft and connector when said front assembly is connected in assembled position, and
i. said driving means, double planetary gear reduction means, and screw conveyer means connected in alignment with each other to rotate said screw conveyor means counterclockwise at the predetermined number of RPM without reduction in torque of said driving means so that the throughput and rate of material extruded by the hand-held extruder is increased.

3. In the hand-held extruder as claimed in claim 2 wherein,
a. the outer housing of said front assembly mans includes, a barrel bushing, and an insulating sleeve,
b. tool rest means mounted about the barrel means on said front assembly means, and
c. said tool rest means clamped and held between the barrel bushing and the insulated sleeve in assembled position.

4. In the hand-held extruder as claimed in claim 2 including,
a. handle bracket means formed on said front assembly means, and
b. handle means detachably connectible to said handle bracket means.

5. In the hand-held extruder as claimed in claim 2 wherein,
a. the outer housing on said front assembly means includes, an end cover,
b. handle connecting means removably mounted on said end cover, and
c. handle means detachably connectible to said handle connecting means.

6. In the hand-held extruder as claimed in claim 2 including, tool rest means mounted about the front assembly means a spaced distance from the pistol grip section on the main housing.

7. In the hand-held extruder as claimed in claim 6, wherein,
a. the tool rest means is a sized annular member having an inner diameter for sliding fit engagement with the exterior of the barrel means, and
b. the annular member made of a material having limited heat conducting capacity.

8. In the hand-held extruder as claimed in claim 2 wherein,
   a. said heating means is disposed in the barrel means,
   b. electrical circuit means connected to said heating means and having, line means connected to a source of electrical current to be delivered to said heating means,
   c. said electrical circuit means including, an on-off switch, and a thermostat for maintaining said barrel means at a predetermined temperature.

9. In a hand-held extruder as claimed in claim 2 or 8 including, a clamp means operatively associated and disposed about the first connection means for connecting the double planetary gear assembly housing to the main housing means to prevent separation of the double planetary gear assembly housing from the main housing means during operation of said extruder.

10. In a hand-held extruder as claimed in claim 2 or 8 wherein,
   a. said main housing has an annular flange connecting means,
   b. the first connection means on said double planetary gear assembly housing is annular and is splined to enable it to be fitted and connected to said annular flange connecting means on said main housing, and
   c. clamp means operative connected about the annular flange connecting means when the first connection means is connected thereon to fixedly connect said double planetary gear assembly housing to said main housing so as to prevent separation during operation of said extruder.

11. In a hand-held extruder as claimed in claims 2 or 8 wherein the barrel means has a hardened steel barrel liner forming the wall of said material feeding passage.

12. In the hand-held extruder as claimed in claim 2 including,
   a. L-shaped handle bracket means detachably connectible to said outer housing on the front assembly means,
   b. handle means having, means for adjustably mounting the handle means on said L-shaped bracket means, and
   c. locking means on said adjustable means for locking the handle in adjusted position on said L-shaped handle bracket means.

13. In a hand-held extruder as claimed in claim 12 wherein,
   a. said main housing has an annular flange connecting means,
   b. the first connection means on said double planetary gear assembly housing is annular and is splined to enable it to be fitted and connected to said annular flange connecting means on said main housing, and
   c. clamp means operatively connected about the annular flange connecting means when the first connection means is connected thereon to fixedly connect said double planetary gear assembly housing to said main housing so as to prevent separation during operation of said extruder.

14. In a hand-held extruder as claimed in claims 1 or 13 wherein the barrel means has a hardened steel barrel liner forming the wall of said material feeding passage and extending end to end there along.

* * * * *

UNITED STATES PATENT AND TRADEMARK OFFICE
CERTIFICATE OF CORRECTION

PATENT NO. : 5,005,731

DATED : April 9, 1991

INVENTOR(S) : Koehler, et al

It is certified that error appears in the above-identified patent and that said Letters Patent is hereby corrected as shown below:

In the Abstract, line 17, "troughput" should read --throughput--
Column 5, line 57, after "ings" insert --.--.
Column 8, line 5, after "extruded" insert --.--.
Column 9, line 40, after "position" insert --.--.
Column 11, line 7, "connecting" should read --connected--.
Column 12, line 23, "connecting" should read --connection--.
Column 12, line 36, "mans" should read --means--.

Signed and Sealed this

Twenty-second Day of September, 1992

Attest:

DOUGLAS B. COMER

Attesting Officer

Acting Commissioner of Patents and Trademarks